Patented Feb. 24, 1948

2,436,641

UNITED STATES PATENT OFFICE 2,436,641

PREPARATION OF AN ALKYD TYPE RESIN

Howard L. Gerhart, Milwaukee, Wis., and Leon M. Adams, Corpus Christi, Tex., assignors to Pittsburgh Plate Glass Company, a corporation of Pennsylvania No Drawing. Original application December 24, 1942, Serial No. 470,028. Divided and this application January 13, 1944, Serial No. 518,108

7 Claims. (Cl. 260—22)

The preparation of tetrahydrophthalic anhydrides, such as cis 3,6,-endomethylene delta 4-tetrahydrophthalic anhydride by the reaction of an alpha beta ethylenic carboxylic acid anhydride and a diene hydrocarbon, such as monomeric cyclopentadiene has long been known. When these are brought together an addition reaction of the Diels-Alder type takes place immediately and the above-described product is obtained in quantitative yield as a white crystalline solid having a melting point of 164° C. Crystals are conveniently purified by dissolving them in naptha and then recrystallizing them.

This is a division of my copending application Serial No. 470,028, filed December 24, 1942, for Preparation of tetrahydrophthalic anhydrides, now Patent No. 2,423,234.

Heretofore this type of reaction has not been applicable to the polymer forms of cyclopentadiene, e. g., dicyclopentadiene, because dicyclopentadiene apparently does not contain a diene group and therefore would not enter into the Diels-Alder type reaction. In order to prepare the addendum product of cyclopentadiene and maleic anhydride or their homologues, it was necessary first to subject the dicyclopentadiene to a cracking operation, the efficiency of which was comparatively low and then to store the resultant cyclopentadiene at a low temperature, in order to prevent repolymerization to form the dicyclic compound.

It has now been found that tetrahydrophthalic anhydrides can be conveniently prepared by reaction between suitable diene hydrocarbons or polymers thereof capable of dissociation into their original monomers and maleic anhydride in a common solvent under pressure in an autoclave. Thus dicyclopentadiene may be induced to react with maleic anhydride in the presence of such common solvents as ordinary naphtha, glyceride oils, mono or diglycerides, fatty acids, and the like by carrying out the reaction under pressure at temperatures above the cracking temperature of dicyclopentadiene. In this manner excellent yields are obtained in a one-step process. Furthermore when the reaction is carried out in the presence of mono or diglycerides or fatty acids, the products may be converted directly into resinous compositions by heating under conditions commonly applied in the manufacture of alkyd resins.

The glycerides may be chosen from common oils such as soya bean oil, corn oil, linseed oil, dehydrated castor oil, and the like. Glycerides may be used as such or may be first converted to mono or diglycerides by heating with suitable quantities of glycerine. When the reaction is carried out in the presence of a diluent such as a naphtha, the product cis 3,6,-endomethylene delta 4-tetrahydrophthalic anhydride is obtained by chilling the solvent, whereupon a purified crystalline material is obtained. The yield is essentially quantitative in contrast to the poor yields obtained in the two-step process wherein dicyclopentadiene is first cracked to its monomer cyclopentadiene.

The nature of the invention will be made more apparent by the following examples:

Example I

A charge consisting of—

| | Pounds |
|---|---|
| Alkali refined soy-bean oil | 16 |
| Maleic anhydride | 3 |
| Dicyclopentadiene | 2 | was heated to 200° C. in an autoclave and held for 30 minutes. The temperature was raised to 250° C. for three hours until a viscosity of 100 seconds was obtained. This vehicle was emulsified for use in an emulsion type paint.

Example II

The example illustrates how the anhydride can be made in the presence of a glyceride mixture. 1054 pounds of alkali refined linseed oil and 170 pounds of glycerol were heated to 232° C. for one hour in the presence of 0.3 pounds litharge to effect a glycerolysis. The above glyceride mixture was charged in the autoclave with 80 pounds of dicyclopentadiene and 121 pounds of maleic anhydride, and heated for 60 minutes at 190° C. The resulting mixture of anhydride and glyceride was interesterified by heating at 210° C. under a strong passage of inert gas to an acid number of 39.3.

It is possible that the cyclopentadiene may to some extent react with the solvents above in the manner of the usual thermal non-catalytic copolymerization. It is also possible that a part of the maleic anhydride may react with the glycerides as is well known. However, the reaction of the maleic anhydride with the monomeric cyclopentadiene takes place very rapidly in the temperature range 180 to 200° C. and the preponderating reaction is the formation of the new anhydride. In the examples given, it is not necessary to isolate the anhydride. The products can be condensed with glycerine or glycol, along with free fatty acids such as oleic acid, linseed oil acids or even oil, to provide alkyd type resins.

Example III

A complete alkyd resin charge was made in an autoclave as follows: A charge of linseed oil acids, glycerol, maleic anhydride and dicyclopentadiene was heated at 200° C. for one hour. The pressure was then released and the homogeneous mass was interesterified by blowing with inert gas at 210° C. until the acid number was reduced to 65. The charge for the autoclave consisted of the following:

| | Pounds |
|---|---|
| Linseed oil acids | 426 |
| Glycerine | 137.5 |
| Maleic anhydride | 141.5 |
| Dicyclopentadiene | 93.7 |

This charge was heated at 200° C. for 30 minutes, then heated under an inert atmosphere at 200° C. to an acid number of 65.4. In the example soy-bean oil acids or tung oil acids may be substituted for linseed oil acids.

Example IV

| | Grams |
|---|---|
| Petroleum naphtha | 400 |
| Maleic anhydride | 240 |
| Dicyclopentadiene | 176 |

The above mixture was heated in an autoclave at 200° C. for 35 minutes. The pressure reached a maximum value of 38 pounds per square inch. The average pressure was 30 pounds per square inch. The reaction product was a slurry of the cis-3,6 endomethylene, delta 4 tetrahydrophthalic anhydride in the naphtha. As the slurry cooled to room temperature, the crystals precipitated. The naphtha was decanted and the dry crystals were charged with glycerized oil to prepare an alkyd-type resin in the well known manner.

The solvent is an essential component of the charge, since when it is omitted, the product is not the monomeric tetrahydrophthalic anhydride. Thus a charge consisting of 600 gm. maleic anhydride and 400 gm. dicyclopentadiene was heated in the absence of a solvent for 30 minutes at 200 to 210° C. The product was a brown partially resinified mass which did not dissolve completely in naphtha. It is evident that the solvent is necessary to produce the product desired.

The forms of the invention herein described are to be considered merely as exemplary and it will be apparent to those skilled in the art that numerous modifications may be made therein without departure from the spirit of the invention or the scope of the appended claims.

What we claim is:

1. In a process of preparing an alkyd type resin which comprises heating in a closed system a mixture of dicyclopentadiene, maleic anhydride and a substance of a class consisting of monoglycerides of acids of a glyceride drying oil, diglycerides of said acids and mixtures of said acids and glycerol initially to a temperature of 180 to 200° C. to convert the dicyclopentadiene and maleic anhydride into cis-3,6 endomethylene, delta 4 tetrahydrophthalic anhydride, then further heating the composition to a temperature to about 210° C. until the alkyd resin is formed.

2. A process of preparing an alkyd type resin which comprises heating a mixture of dicyclopentadiene and maleic anhydride dissolved in glycerized glyceride drying oil in a closed container to a temperature of about 190° C. until the dicyclopentadiene and maleic anhydride are converted in situ into cis-3,6 endomethylene, delta 4 tetrahydrophthalic anhydride, then heating the resultant mixture to a temperature of about 210° C. to convert said mixture into said resin, the heating operation being conducted until an acid value of about 39 is obtained.

3. A process of preparing an alkyd type resin which comprises heating to a temperature of about 200° C. a mixture of drying oil acids, glycerine, maleic anhydride and dicyclopentadiene in a closed container whereby to convert the dicyclopentadiene and maleic anhydride into cis-3,6 endomethylene, delta 4 tetrahydrophthalic anhydride, then heating the mixture to a temperature of about 210° C. until an acid value of approximately 65 is attained.

4. A process of preparing an alkyd type resin which comprises heating a mixture of dicyclopentadiene and maleic anhydride in glycerized linseed oil by heating said mixture in a closed container for about sixty minutes at a temperature of about 190° C., then subsequently raising the temperature of the resulting mixture of anhydride and glyceride to a temperature of about 210° C. until an acid number of about 39.3 is attained.

5. A process as defined in claim 4 in which the glycerized linseed oil is obtained by heating a mixture of about 1054 parts by weight of linseed oil with 170 parts by weight of glycerol at a temperature of 232° C. for one hour.

6. A process of preparing an alkyd type resin which process comprises heating in a closed container for a period of about 60 minutes and at a temperature of about 190° C., 80 parts by weight of dicyclopentadiene, 121 parts by weight of maleic anhydride and a glycerized glyceride drying oil obtained by glycerolysis of 1054 parts by weight of linseed oil with 170 parts by weight of glycerol, the resultant product of the glycerized linseed oil, dicyclopentadiene and maleic anhydride then further being heated to a temperature of about 210° C. until an acid number of 39.3 is attained.

7. A process of preparing an alkyd type resin which process comprises heating for about 30 to 60 minutes at a temperature of about 180 to 200° C. in a closed container, a mixture of dicyclopentadiene, maleic anhydride and a glyceride selected from a class consisting of mono and diglycerides of drying oil acids in order to form cis-3,6 endomethylene, delta 4 tetrahydrophthalic anhydride in situ, then heating the mixture to a temperature of esterification of the glyceride and said cis-3,6 endomethylene, delta 4 tetrahydrophthalic anhydride to form said resin.

HOWARD L. GERHART.
LEON M. ADAMS.

REFERENCES CITED

The following references are of record in the file of this patent:

UNITED STATES PATENTS

| Number | Name | Date |
|---|---|---|
| 2,235,447 | Bradley et al. | Mar. 18, 1941 |
| 2,251,297 | Soday | Aug. 5, 1941 |
| 2,345,948 | Pellett | Apr. 4, 1944 |

FOREIGN PATENTS

| Number | Country | Date |
|---|---|---|
| 352,164 | Great Britain | July 9, 1931 |